United States Patent
Wang et al.

(10) Patent No.: US 8,112,215 B2
(45) Date of Patent: Feb. 7, 2012

(54) CRUISE CONTROL AND ACTIVE FUEL MANAGEMENT (AFM) INTERACTION

(75) Inventors: Lan Wang, Troy, MI (US); Wenbo Wang, Novi, MI (US); Zhong Wang, Westland, MI (US); James L. Worthing, Munith, MI (US); Michael Kappaz, Troy, MI (US)

(73) Assignee: GM Global Technology Operations LLC

( * ) Notice: Subject to any disclaimer, the term of this patent is extended or adjusted under 35 U.S.C. 154(b) by 820 days.

(21) Appl. No.: 12/187,564

(22) Filed: Aug. 7, 2008

(65) Prior Publication Data

US 2009/0319147 A1    Dec. 24, 2009

Related U.S. Application Data

(60) Provisional application No. 61/073,796, filed on Jun. 19, 2008.

(51) Int. Cl.
*B60K 31/00* (2006.01)
(52) U.S. Cl. .............................. 701/96; 701/93
(58) Field of Classification Search .................. 701/93, 701/96; 180/170; 123/349–352
See application file for complete search history.

(56) References Cited

U.S. PATENT DOCUMENTS 5,854,877 A * 12/1998 Lewis .......................... 388/812

* cited by examiner

*Primary Examiner* — Yonel Beaulieu

(57) ABSTRACT

A method and controller for operating cruise control in a vehicle having an engine with active fuel management (AFM) is provided. Adaptive scaler values can be determined based on a cylinder deactivation signal and calibrated scaler values. Cruise control commands can be calculated based on the adaptive scaler values. A speed of the vehicle can be controlled based on the cruise control commands.

19 Claims, 3 Drawing Sheets

CRUISE CONTROL AND ACTIVE FUEL MANAGEMENT (AFM) INTERACTION

CROSS-REFERENCE TO RELATED APPLICATIONS

This application claims the benefit of U.S. Provisional Application No. 61/073,796 on Jun. 19, 2008. The disclosure of the above application is incorporated herein by reference.

FIELD

The present disclosure relates to internal combustion engines, and more particularly to methods and systems for operating cruise control with an active fuel management engine system.

BACKGROUND

The statements in this section merely provide background information related to the present disclosure and may not constitute prior art.

Some internal combustion engines include engine control systems that deactivate cylinders under low load situations. For example, an eight cylinder engine can be operated using four cylinders to improve fuel economy by reducing pumping losses. This process is generally referred to as active fuel management (AFM). Operation using all of the engine cylinders is referred to as an "activated" mode (AFM disabled). A "deactivated" mode (AFM enabled) refers to operation using less than all of the cylinders of the engine (one or more cylinders not active).

In the deactivated mode, there are fewer cylinders operating. Nonetheless, there can still be adequate drive torque available to drive the vehicle driveline (such as during cruise control) and accessories (e.g., alternator, coolant pump, A/C compressor). Engine efficiency, however, is increased as a result of less engine pumping loss and higher combustion efficiency. The pumping loss experienced by the engine is mainly due to the flow restriction for flow into and out of the cylinders. The quantity of air and/or the composition/quality of gas in the cylinder can play minimum role to pumping loss during compression and expansion processes because the compression work (−) and the expansion work (+) will be traded.

Cruise control systems can be provided for maintaining a vehicle at a fixed operating speed. In some instances, a vehicle can be operating in a "deactivated" mode (AFM enabled) while cruise control is engaged. As is typical however, it may be necessary for the engine control system to command a torque increase in order to maintain the fixed operating speed due to outside influences (such as encountering a hill, etc.). As a result, AFM typically would transition to a disabled state to provide the required torque (i.e., to the "activated" mode).

SUMMARY

A method and controller for operating cruise control in a vehicle having an engine with active fuel management (AFM) is provided. Adaptive scaler values can be determined based on a cylinder deactivation signal and calibrated scaler values. Cruise control commands can be calculated based on the adaptive scaler values. A speed of the vehicle can be controlled based on the cruise control commands.

According to additional features, calculating the cruise control command can include calculating a first cruise control command for the engine operating when AFM is enabled and calculating a second cruise control command for the engine operating when AFM is disabled. A vehicle speed error can be determined based on a measured vehicle speed and a desired set vehicle speed. The first cruise control command can be based on a product of the calibrated scaler values and each of a proportional, integral and derivative term associated with the first cruise control command. The controller can determine whether the engine is transitioning out of AFM and transition to the second cruise control command based on the determination. In the second cruise control command, the adaptive scaler values are 1. In one example, the adaptive scaler values can be ramped to 1. According to other features, the controller can determine whether the engine is transitioning into AFM and transition to the first cruise control command based on the determination.

Further areas of applicability will become apparent from the description provided hereinafter. It should be understood that the detailed description and specific examples are intended for purposes of illustration only and are not intended to limit the scope of the present disclosure.

DRAWINGS

The present invention will become more fully understood from the detailed description and the accompany drawings, wherein.

DETAILED DESCRIPTION

Figure 1:
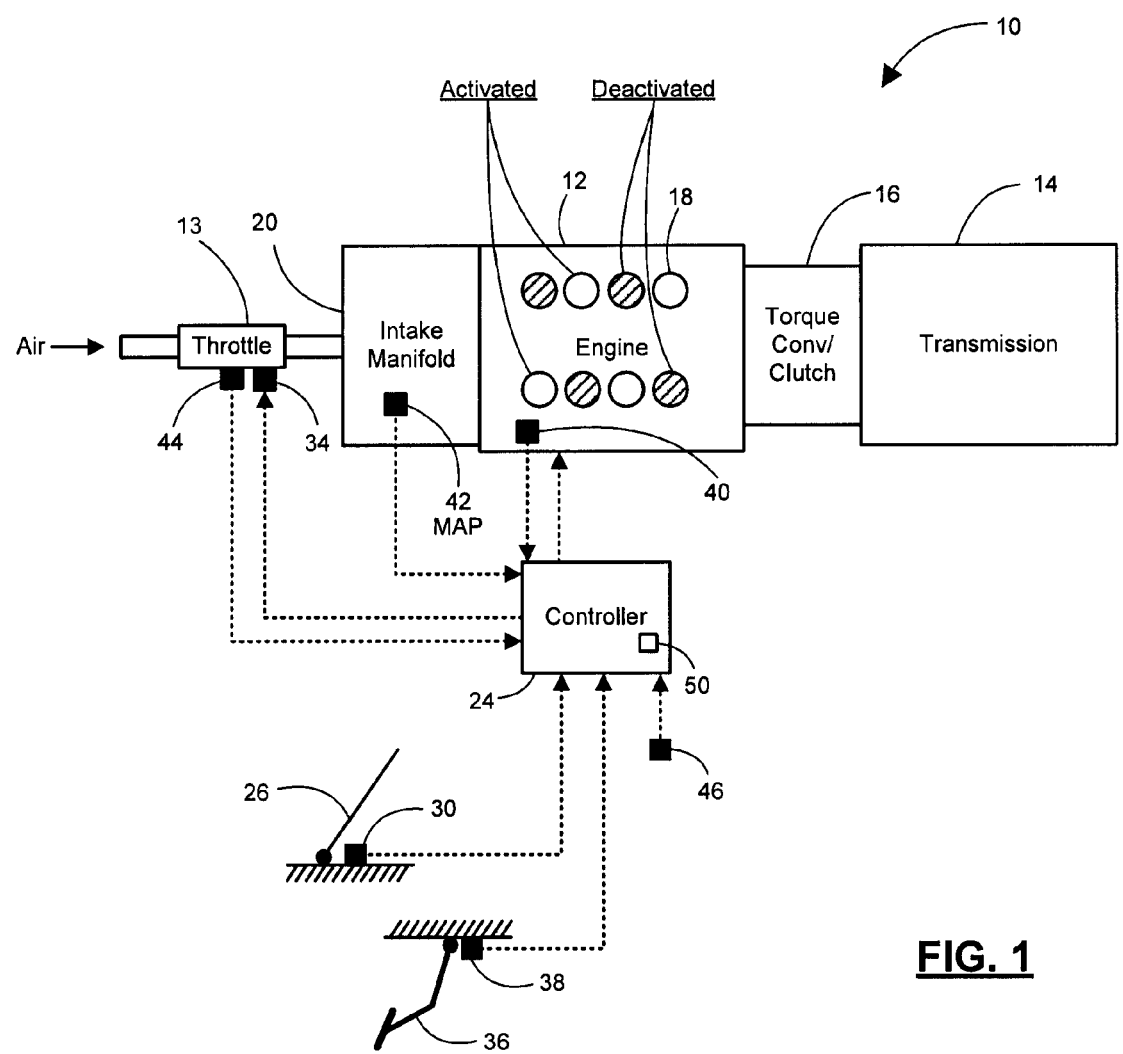
FIG. 1 is a functional block diagram illustrating a vehicle powertrain including an active fuel management (AFM) engine control system according to the present teachings.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 can include an engine 12 that drives a transmission 14. The transmission 14 can be either an automatic or a manual transmission that is driven by the engine 12 through a corresponding torque converter or clutch 16. Air flows into the engine 12 through a throttle 13. The engine 12 can include N cylinders 18. One or more of the cylinders 18 can be selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air can flow into the engine 12 through an intake manifold 20 and be combusted with fuel in the cylinders 18.

A control module 24 can communicate with the engine 12 and various inputs and sensors as discussed herein. A vehicle operator can manipulate an accelerator pedal 26 to regulate the throttle 13. More particularly, a pedal position sensor 30 can generate a pedal position signal that is communicated to the control module 24. The control module 24 can generate a throttle control signal based on the pedal position signal. A throttle actuator 34 can adjust the throttle 13 based on the throttle control signal to regulate air flow into the engine 12.

The vehicle operator can manipulate a brake pedal 36 to regulate vehicle braking. More particularly, a brake position sensor 38 can generate a brake pedal position signal that is communicated to the control module 24. The control module 24 can generate a brake control signal based on the brake pedal position signal. A brake system (not shown) can adjust vehicle braking based on the brake control signal to regulate vehicle speed.

An engine speed sensor 40 can generate a signal based on engine speed. An intake manifold absolute pressure (MAP) sensor 42 can generate a signal based on a pressure of the intake manifold 20. A throttle position sensor (TPS) 44 can generate a signal based on throttle position. A vehicle speed sensor 46 can generate a signal based on a vehicle speed.

The control module 24 can comprise a cruise control module 50. In general, the cruise control module 50 can communicate with the actuator 34 for positioning the throttle 13 in relation to the difference between a commanded vehicle speed (i.e., such as from the pedal position sensor 30) and a measured actual vehicle speed (i.e., such as from the vehicle speed sensor 46). This difference commonly referred to as speed error, e(t) is represented by the following formula:

$$e(t) = \text{measured vehicle speed} - \text{desired set vehicle speed} \quad (1)$$

The cruise control module 50 can perform mathematical processing of the speed error e(t) and other related signals. In some examples, the mathematical processing can include calculations using look-up tables that can take into account vehicle specific characteristics and time constants. The mathematical processing can comprise various combinations of proportional, integral and derivative (PID) terms. The cruise control module 50 can determine a cruise control command or gain for two different operating conditions, one with AFM "OFF" (disabled) and one with AFM "ON" (enabled). These two gains can be represented by the following formulas:

$$\text{AFM"OFF"Command} = Cp * e(t) + Ci * \text{integral of } e(t) + Cd * \text{derivative of } e(t) \quad (2)$$

$$\text{AFM"ON" Command} = Kp*Cp*e(t) + Ki*Ci*\text{integral of } e(t) + Kd*Cd*\text{derivative of } e(t) \quad (3)$$

where Kp, Ki and Kd are calibratable scalers that can range from 0 to 1 and can be a function of vehicle speed error (e(t)). As used hereinafter, Kp, Ki and Kd are reserved collectively as "K-values". As can be appreciated, by incorporating the K-values into the AFM "ON" command, the determination to transition out of AFM when cruise control is engaged will be delayed resulting in fuel savings. Cp, Ci and Cd are control gains, respectively, for PID. By resetting K-values to 1, for the AFM "OFF" command, normal cruise control is resumed.

Figure 2:
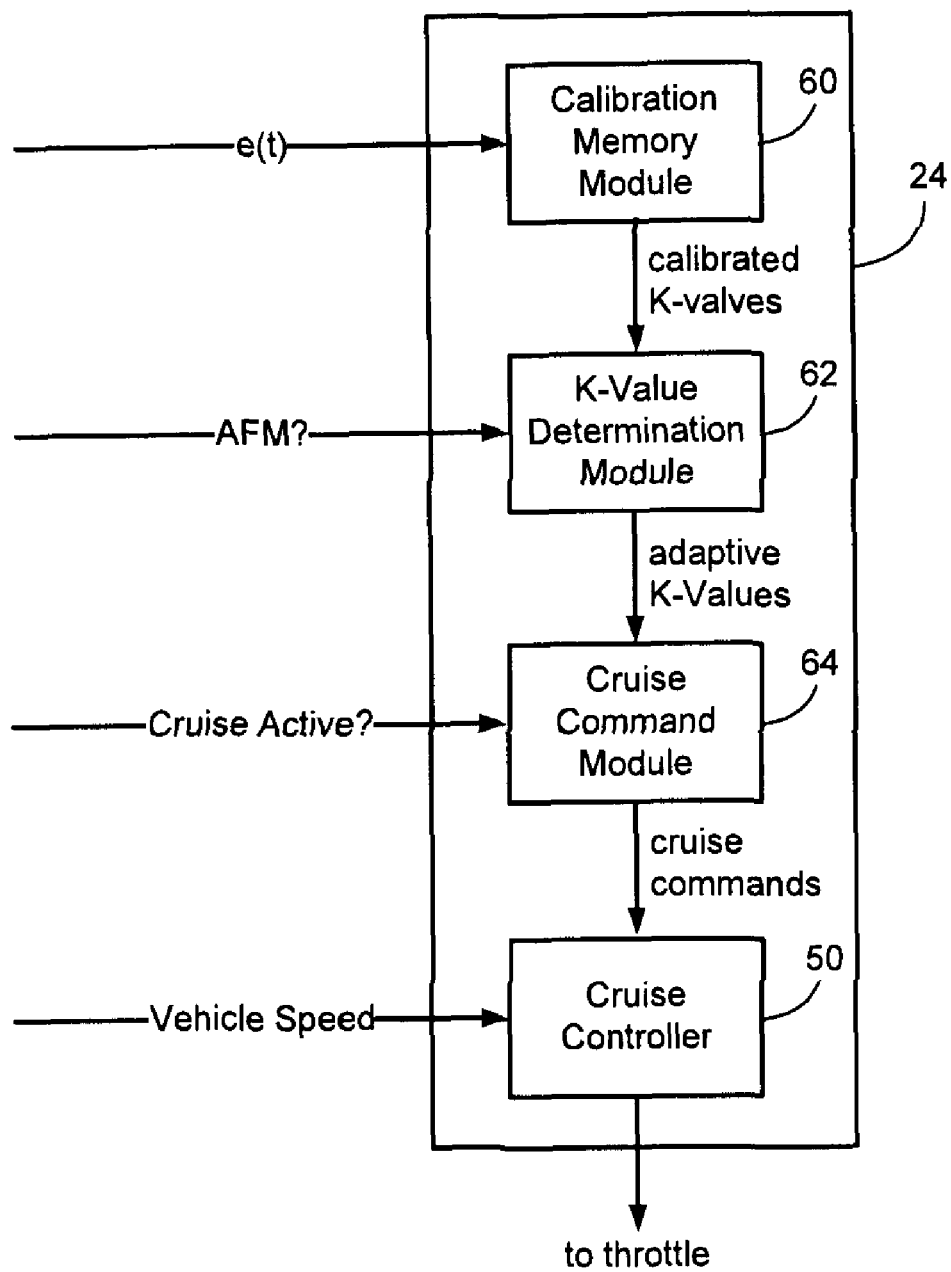
FIG. 2 is a functional block diagram of an exemplary control module according to the present teachings.

With reference now to FIG. 2, the control module 24 according to one example of the present teachings will be described. The control module 24 can include a calibration memory module 60, a K-value determination module 62, a cruise command module 64 and the cruise controller 50. The calibration memory module 60 can determine calibrated K-values based on the vehicle speed error e(t). In one example, the calibrated K-values can be determined with a lookup table. The K-value determination module 62 can determine adaptive K-values based on the calibrated K-values and an AFM status signal. The cruise command module 64 can determine cruise commands (i.e., AFM "OFF" Command and AFM "ON" Command shown above) based on the adaptive K-values and a cruise status signal. The cruise controller 50 can output a cruise control signal to the throttle 13 based on the cruise commands determined by the cruise command module 64 and a vehicle speed (i.e. such as from the speed sensor 46).

Figure 3:
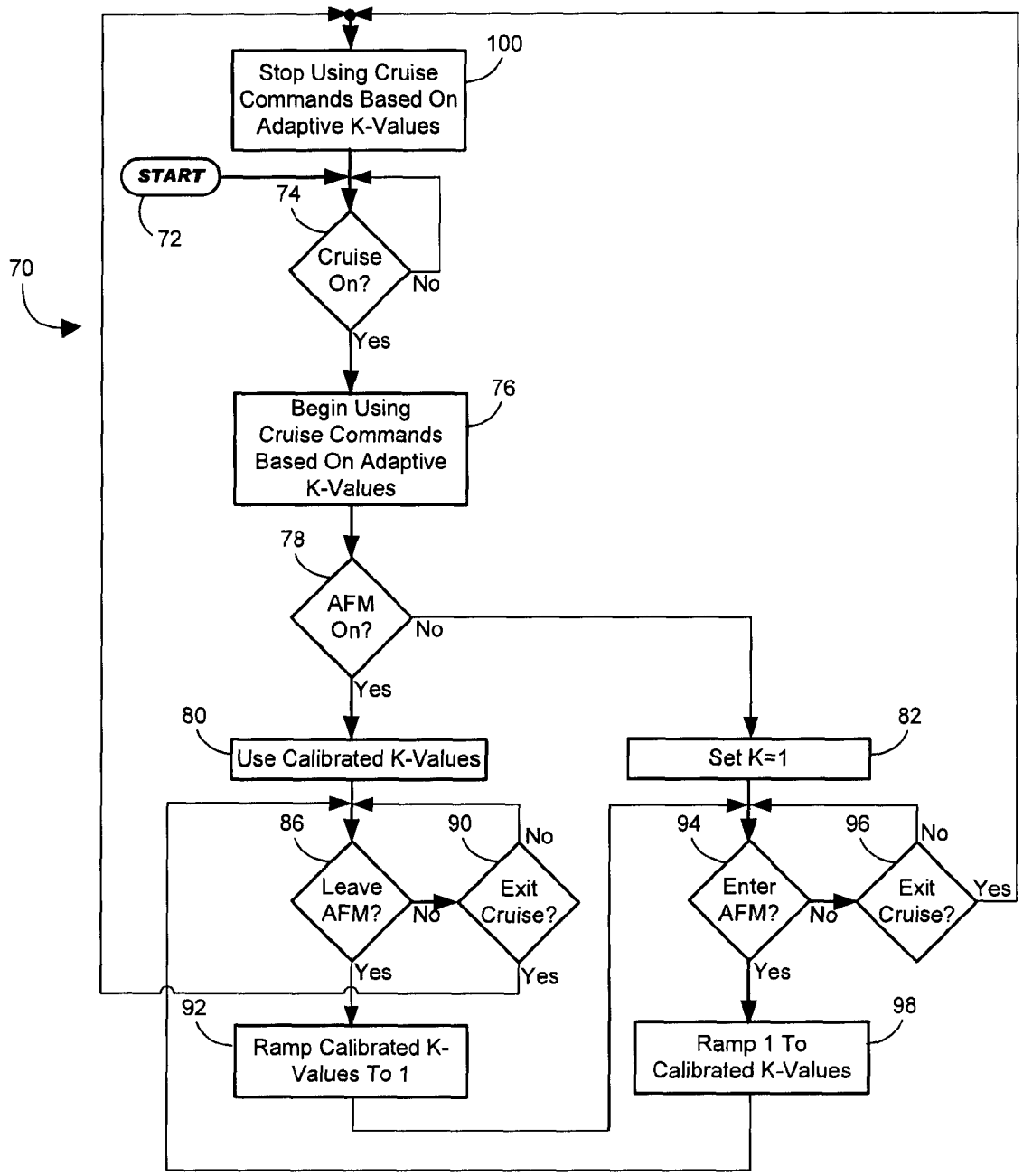
FIG. 3 is an exemplary flowchart illustrating steps for operating the AFM engine control system of FIG. 1 according to one example of the present teachings.

With reference now to FIG. 3, exemplary steps for operating cruise control in a vehicle having an engine with AFM will be described. The method is generally identified at reference numeral 70. Control begins in step 72. In step 74 control determines if cruise control is on. If cruise control is on, control begins using cruise commands based on the adaptive K-values in step 76. If cruise control is not on, control loops to step 74. In step 78 control determines if AFM is on. If AFM is on, control uses the calibrated K-values. If AFM is not on, control sets the K-values to 1 in step 82. In step 86 control determines if the engine 12 is transitioning out of AFM. If the engine is transitioning out of AFM, control ramps the calibrated K-values to 1 in step 92. By ramping the K-values to 1, a gradual blending can be imposed on the final cruise control (torque/throttle area) command at the transition out of AFM when cruise control is engaged. It is appreciated that such blending can be symmetric or unsymmetric (relative to a blending associated with a transition into AFM). In one example, a calibration timer T1 can be assigned for transitions out of AFM. The blending factor can be t/T1 where a timer t starts counting once the transition begins. In one example, a transition from AFM "ON" to AFM "OFF" can be represented by the following formula:

$$\text{scalers } Kx' = Kx + (1-Kx)*t/T1 \quad (4)$$

where x represents p, i and d.

If the engine is not transitioning out of AFM, control determines if cruise is being disabled in step 90. If cruise is not being disabled, control loops to step 86. If cruise is being disabled, control loops to step 100. In step 100, control stops using cruise commands based on the adaptive K-values.

Once the K-values have been ramped to 1 in step 92, control loops to step 94. In step 94, control determines if the engine 12 is entering AFM. If the engine 12 is entering AFM, control ramps the K-values from 1 to the calibrated K-values in step 98 and then loops to step 86. By ramping the K-values to the calibrated K-values, a gradual blending can be imposed on the final cruise control (torque/throttle area) command at the transition into AFM when cruise control is engaged. In one example, a calibration timer T2 can be assigned for transitions into AFM. The blending factor can be (1−t/T2). In one example, a transition from AFM "OFF" to AFM "ON" can be represented by the following formula:

$$\text{scalers } Kx' = Kx + (1-Kx)*(1-t/T2) \quad (5)$$

where x represents p, i and d.

If the engine 12 is not entering AFM in step 94, control determines if cruise is being disabled in step 96. If cruise is being disabled, control loops to step 100. If cruise is not being disabled in step 96, control loops to step 94.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for operating cruise control in a vehicle having an engine with active fuel management (AFM), the method comprising:
   determining adaptive scaler values based on a cylinder deactivation signal and calibrated scaler values;
   calculating cruise control commands based on the adaptive scaler values; and
   controlling a speed of the vehicle based on the cruise control commands.

2. The method of claim 1 wherein calculating the cruise control commands comprises calculating a first cruise control command for the engine operating when AFM is enabled and calculating a second cruise control command for the engine operating when AFM is disabled.

3. The method of claim 2 further comprising, determining a vehicle speed error.

4. The method of claim 3 wherein the vehicle speed error is based on a measured vehicle speed and a desired set vehicle speed.

5. The method of claim 4 further comprising, determining the calibrated scaler values based on the vehicle speed error.

6. The method of claim 5 wherein the first cruise control command is based on a product of the calibrated scaler values and each of a proportional, integral and derivative term associated with the first cruise control command.

7. The method of claim 2, further comprising:
   determining whether the engine is transitioning out of AFM; and
   transitioning to the second cruise control command wherein the adaptive scaler values are one.

8. The method of claim 7 wherein the transitioning comprises ramping the adaptive scaler values from the calibrated scaler values to one.

9. The method of claim 2, further comprising:
   determining whether the engine is transitioning into AFM; and
   transitioning to the first cruise control command wherein the calibrated scaler values are between zero and one.

10. The method of claim 9 wherein the transitioning comprises ramping the adaptive scaler values from one to the calibrated scaler values.

11. A controller for operating cruise control in a vehicle having an engine with active fuel management (AFM), the controller comprising:
   a scaler value determination module that determines adaptive scaler values based on a cylinder deactivation signal and calibrated scaler values;
   a cruise command module that calculates cruise control commands based on the adaptive scaler values; and
   a cruise control module that controls a speed of the vehicle based on the cruise control commands.

12. The controller of claim 11 wherein the cruise command module calculates a first cruise control command for the engine operating when AFM is enabled and calculates a second cruise control command for the engine operating when AFM is disabled.

13. The controller of claim 12 further comprising, a calibration memory module that determines the calibrated scaler values based on a vehicle speed error.

14. The controller of claim 13 wherein the vehicle speed error is based on a measured vehicle speed and a desired set vehicle speed.

15. The controller of claim 14 wherein the first cruise control command is based on a product of the calibrated scaler values and each of a proportional, integral and derivative term associated with the first cruise control command.

16. The controller of claim 12 wherein the cruise command module determines whether the engine is transitioning out of AFM and transitions to the second cruise control command wherein the adaptive scaler values are one based on the determination.

17. The controller of claim 16 wherein the cruise command module ramps the adaptive scaler values from the calibrated scaler values to one.

18. The controller of claim 12 wherein the cruise command module determines whether the engine is transitioning into AFM and transitions to the first cruise control command wherein the calibrated scaler values are between zero and one based on the determination.

19. The controller of claim 18 wherein the adaptive scaler values are ramped from one to the calibrated scaler values.

* * * * *